United States Patent [19]
Bjorhaag

[11] 4,409,175
[45] Oct. 11, 1983

[54] METHOD OF PRESHAPING A PREFORMED LIGNOCELLULOSIC MAT FOR MOLDING INTO A STRUCTURAL MEMBER

[75] Inventor: Georg Bjorhaag, Amal, Sweden

[73] Assignee: Byggnads AB Hammaren, Bromma, Sweden

[21] Appl. No.: 187,765

[22] Filed: Sep. 16, 1980

[51] Int. Cl.$^3$ .................................... B29J 5/00
[52] U.S. Cl. .................................... 264/517; 264/518; 264/547; 264/553; 264/571; 264/DIG. 78; 264/118; 264/122
[58] Field of Search ............... 264/517, 518, 547, 553, 264/571, DIG. 78, 118, 110, 122

[56] References Cited

U.S. PATENT DOCUMENTS

| | | | |
|---|---|---|---|
| 3,882,211 | 5/1975 | Kamp | 264/518 |
| 4,081,501 | 3/1978 | Muther | 264/518 |
| 4,263,239 | 4/1981 | Dunbar et al. | 264/518 |

*Primary Examiner*—James R. Hall
*Attorney, Agent, or Firm*—Frishauf, Holtz, Goodman & Woodward

[57] ABSTRACT

A molding mixture comprising a filler, such as wood particles and a resin binder, is pressed under light pressure on a flat bed to produce a mat with a density between 1/15 and ⅓ of the material in the finished article to be made by pressure molding. A molding preform is then made from a piece of such mat having a suitable contour, by sculpturing one side of the mat with suction devices to provide a thickness variation over the mat area corresponding to the requirements of the molding step.

12 Claims, 12 Drawing Figures

METHOD OF PRESHAPING A PREFORMED LIGNOCELLULOSIC MAT FOR MOLDING INTO A STRUCTURAL MEMBER

This invention concerns the making of preforms of a molding mixture composed of a filler, preferably wood particles, and of a binder such as a thermosetting or thermoplastic synthetic resin, for placing in mold in which a structural member, such as a door or a flight of stairs, for example, is made from the preform under pressure.

BACKGROUND OF THE INVENTION

In the molding under pressure of resin bonded fillers such as wood particles, it is desirable that the amount of compaction should generally be uniform in the final molding process even though the shape of the article may be more or less complicated and the thickness of various parts of the article may vary. Furthermore, if the density of some portion of the article to be made needs to be greater or less than the remainder, that is likely to be a requirement quite independent of the depth of the corresponding location in the mold half in which the molding mixture is placed prior to the final pressing step.

This is particularly important for the molding of structural members of buildings, since they are required to bear loads. The strength of the various portions of the molded articles must be made to stringent specification.

Efforts have been made to meet this problem by filling different portions of the lower mold half to different levels with a molding mixture in accordance with instructions carefully observed by personnel in charge of filling the molds. Distribution of the molding mixture in the lower mold half by vibrating the latter has also been used. Knife blades have also been proposed for profiling the filling of a molding mixture in a mold by scraping the filling down in some places and piling it up in others as the knife blade travels across a filled mold. These methods are not fully suitable for distributing the molding mixture for molding building components of complicated shape, except in special cases usually involving relatively simpler shapes.

In the molding of smaller articles preforms have first been made, by a preliminary molding step or by a subdivision of partly consolidated material, and then subjected to the final load. The provision of preforms large enough for structural members and having sufficient cohesion for some handling without going too far in the compaction of the material or the curing of the binder presents a good many problems.

SUMMARY OF THE INVENTION

It is an object of the invention to provide a method for providing molding preforms suitable for the molding of structural members for buildings, furniture and other structures that will enable the structural members to be effectively and reliably manufactured in quantity and will be sufficiently cohesive for transfer from a preforming station to a final molding station in factory. It is a further object of the invention to provide such a method in a form suitable for the handling of molding mixtures in which the filler material in fibrous, as in the case of wood particles, and in which the binder is a thermosetting or thermoplastic synthetic resin.

Briefly, the molding mixture is first consolidated to an extent just sufficient for cohesion in the form of a mat. For most applications this can be done on a flat bed press and the mat can be made large enough to be subdivided into portions each of which will be used to make preforms. The flat bed type of pre-pressing is particularly useful, since a layer of uniform thickness can then easily be provided while the molding mixture is still unconsolidated. Furthermore, the consolidation of the molding mixture into a mat can be aided by providing suction from below through small openings in the bed which are smaller than the minimum size of the particles of filler, thus reducing the amount of pressure that needs to be applied from above the bed.

After a piece of molding mixture mat of suitable contour has been made or has been cut from a larger mat, a preform is then fashioned by profiling the thickness of the mat from one side, which is performed by removing material from one side of the mat, by suction, to the proper depth in order to leave the correct remaining thickness. This can be done in a horizontal position, but may also be done with the mat positioned vertically alongside a suitable backing plate.

The profiling or sculpturing of the mats can be accomplished by moving a suction device to the mat perpendicular to the surface, in which case the suction device must have suction orifices in a pattern corresponding to the profiling to be achieved, or it may be accomplished by moving one or more suction devices across the surface of a mat under a control system that causes them to penetrate the mat to the proper depth at each location along the length of a path of the suction device across the mat. The suction device may be assisted in its removal of material from the mat by vibrating it or by providing some other type of agitation, or from cutting action at the edges of a suction orifice. Various means of facilitating the laying of the mat in proper registry in a mold half for final molding may be provided, such as accurate contouring, or removable tab with registry holes.

The mat from which the preform is made should normally be made of a level bed of particles impregnated with between 1 and 25%, by weight, of binder resin, and preferably between 12 to 15% of binder resin. The pressing of the mat is preferably performed so as to reduce the thickness of the loose layer by 30 to 50% and thereby to produce a mat having 3 to 15 times the specific volume (i.e., ⅓ to 1/15 of the density) of the material in the finished form of the article to be produced. The compaction of the sculptured mat by final pressing is essentially all in the vertical or thickness dimension.

BRIEF DESCRIPTION OF THE DRAWINGS

The invention is further described with illustrative examples with reference to the annexed drawings, in which.

DESCRIPTION OF THE ILLUSTRATED PROCESSES

Figure 1:
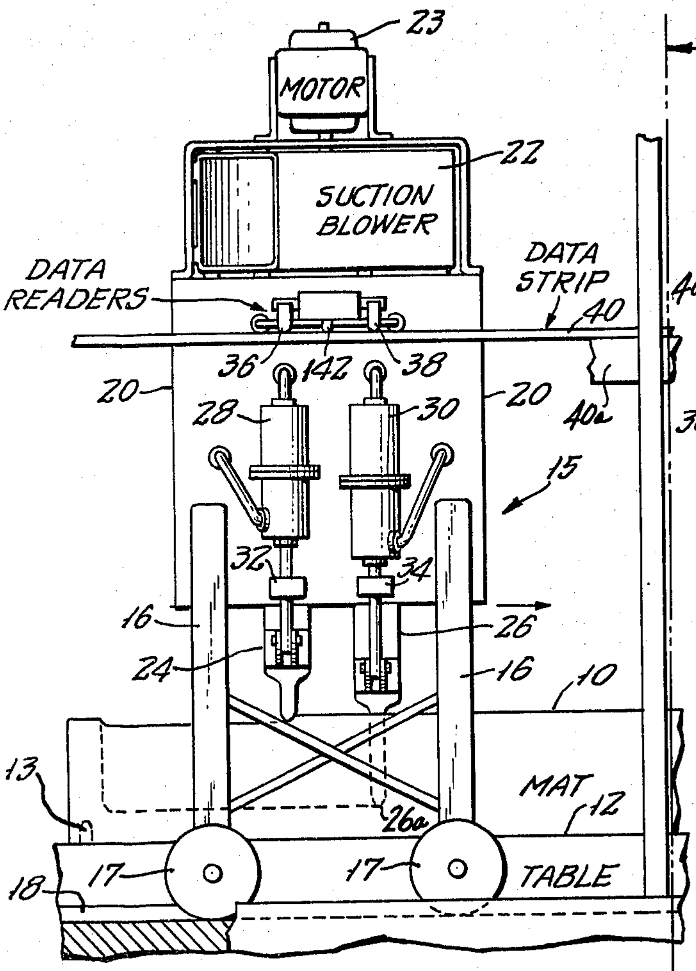
FIG. 1 is a schematic side elevation.

FIG. 1 shows a pre-pressed mat 10 of molding material in place on a table 12. The mat is one prepared by a prepressing step, as already mentioned, in a flat bed press by suction from below, with just enough pressure on top to assure a substantially flat surface, so that that portion of the atmospheric pressure does most of the pressing. The composition of the mat is of the preferred kind, namely a mixture of wood particles and a synthetic resin binder, for example, a resin, the resin impregnation and coating of the particles being in the preferred range of 12 to 15% by weight. The illustrated case, in order to simplify the drawing, corresponds to a mat of the denser sort, namely one having about ⅓ to 1/6 of the density that the material is intended to have in the finished article, whereas the density range that has been found useful in the practice of the invention extends from ⅓ to 1/15 of the design density of the material for the finished article. The denser the mat, the smaller is the vertical range of sculpturing to be provided on the mat.

As already explained, the mat is preferably a piece of a much bigger mat that has been cut in a contour suitable for a particular mold, which itself may be quite large, as for the mold of a door or of a flight of stairs, the latter being taken as a suitable example for this figure. In the illustrated case the contour of the mat is slightly elongated to permit positioning the mat on the table on pins provided at each corner, one of these illustrated at 13. Prior to setting the mat on the table, holes were bored in the mat in any suitable way, by suction or by a flat blade drill, to fit the pin 13 so that the mat will not be dragged out of place during sculpturing. Such precautions are not necessary, incidentally, in the process illustrated in FIG. 4 where the sculpturing is done entirely vertically.

Since the mat is to be sculptured only from one side, the profile to be sculptured does not take account of the mold that is eventually to be used, but only of the thickness of the material to be compressed, measured vertically from the bottom of the mold, so that in the case of a staircase mold, the profile will not show the zigzags of the steps, but only the changes of thickness in the vertical plane. With a large compression ratio the shaping of the zigzags in the mold has relatively little effect on the uniformity of the density of the final product. A slight degree of extra density at the angles may be useful.

The foregoing characteristics of the invention stand in contrast to the dressing of the filling material in a lower mold-half by means of moving blades described with reference to FIG. 11 of my U.S. Pat. No. 4,226,820, granted Oct. 7, 1980.

The sculpturing of the mat 10 on the table 12 in FIG. 1 is performed by means of a suction device 15 mounted on a carriage 16 having wheels 17 running in grooves 18. Mounted on this carriage is a plenum 20 from which the air is sucked out by a blower 22 driven by a motor 23. An underpressure anywhere from a slight suction down to about ½ of atmospheric pressure is suitable, according to the density and composition of the mat to be sculptured and the amount of leakage around the sliding sheaths, described below, of the suction devices that actually do the sculpturing.

The automatic system for causing the blower to maintain the suitable underpressure is omitted from the drawings in order to simplify the illustration. Likewise the source of motor force for propelling the carriage 16 over the length of the mat 10 is omitted, although it will be understood that this propulsion can be provided by another motor mounted on the carriage 16 or by a pulling or pushing member connected with an external propulsion device.

In the illustrated case, there are three vertically movable suction devices suspended from the plenum 20. At each edge of the mat there is a suction device 24 for trimming the surfaces of the edge portions of the mat which are to provide the side stringer portions of a flight of stairs, these suction devices being narrow in the dimension perpendicular to the paper in the case of FIG. 1 and in the horizontal dimension of FIG. 2, while the central portion of the mat is sculptured by a suction blade 26 having a long suction slot 26a at the bottom, running perpendicular to the plane of the drawing.

Figure 2:
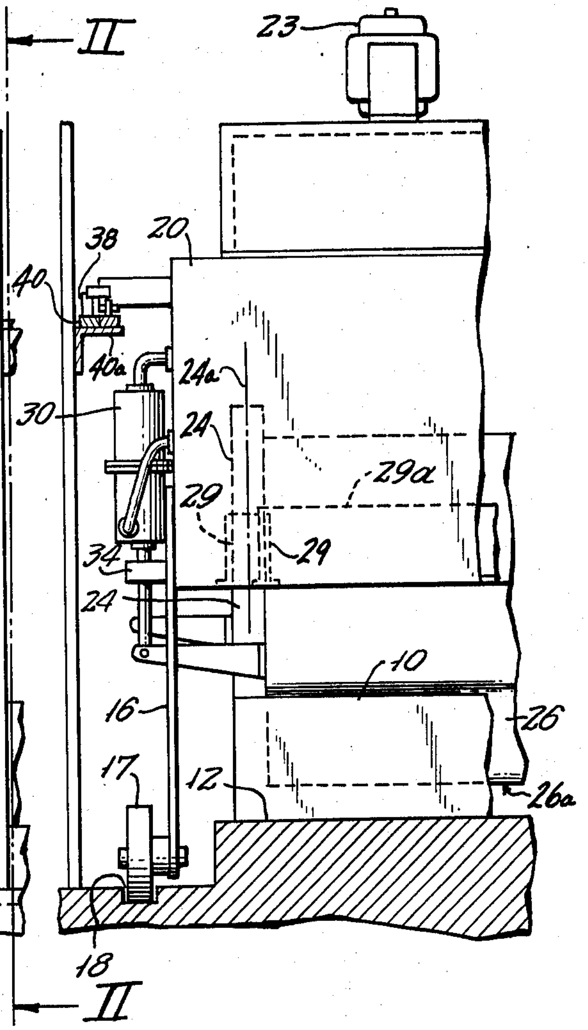
FIG. 2 is a partial front elevation partly in section (on line II—II of FIG. 1), of apparatus for sculpturing a mat of molding material in accordance with the invention.

The suction device 24 has its vertical level controlled by a double acting hydraulic cylinder 28. A single cylinder is adequate for this purpose and it does not need to be offset from the median axis 24a of the suction device 24 so far as shown in FIG. 2 for purposes of explanation. In any event the suction device 24 is guided in a strictly vertical path by a sheath tube 29 (shown in broken lines in FIG. 2) fixed on the bottom of the plenum 20, which fits tightly enough to prevent undue leakage of air into the plenum 20, but loosely enough to allow sliding of the suction device 24 up and down. Another suction device 24, not visible in FIG. 1 located at the other side of the plenum 20 which does not appear in FIG. 2, is similarly controlled to sculpture the edge portion of the mat end which will provide the stringer portions at the other side of the stairs which are to be molded.

The suction blade 26, since it provides a long slot 26a going almost all the way across the mat 10, has its vertical level controlled by two hydraulic cylinders 30, only one of which is shown in FIGS. 1 and 2, one of them at each end of the suction blade 26.

The hydraulic cylinders 28 and 30 are part of a hydraulic servo system which need not be further described for accurately controlling the vertical level of the respective suction devices. Transducers 32 and 34 read the exact vertical position of the respective systems of the hydraulic cylinders 28 and 30 to provide the necessary position feedback to the servo system for comparison of the desired position. First and second readers 36 and 38 provide electrical signals in response to data on two tracks (not shown) of a data strip 40 carried on a support 40a indicating the desired level of the suction devices for their location at the moment, this being the command signal of the servo system which is not shown but is included in the equipment on the carriage 16.

A third data reader 142 senses another track on the data strip 40 which indicates accurately the position of the carriage 16 for controlling the speed and/or the position of the carriage 16 in a well known way. It is possible to provide other data readers, or some translators relating to the data reader 142, for programming other actions of the equipment on the carriage 16 as it progresses, for example, movement of either the plenum 20 relative to the carriage 16 or of one or more of the suction devices relative to the plenum 20.

Figure 3:
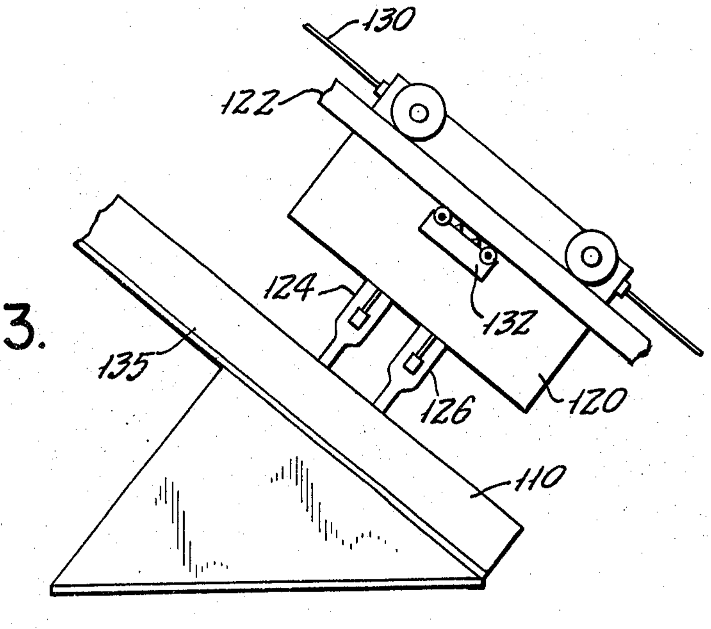
FIG. 3 is a highly schematic side elevation of suspended apparatus or sculpturing a mat disposed at an angle to the horizontal plane.

FIG. 3 illustrates the fact that it is not necessary for the mats to be horizontal and also illustrates that the plenum, in this case the plenum 120, can be suspended on rails 122 instead of supported on the plate 135 which carries the mat 110 and which corresponds to the table 12 of FIGS. 1 and 2. The plenum 120 is moved by means of an "endless" cable 130, driven by means not shown. In this case the data strip is provided on the bottom surface of one of the rails 122 and the data reader assembly 132 is provided to read the underside of the rail 122. It is evident that the backing plate 135 could be vertical, with the mat 110 suspended vertically and the plenum 120 could be caused to move up and down like an elevator carriage.

Figure 4:
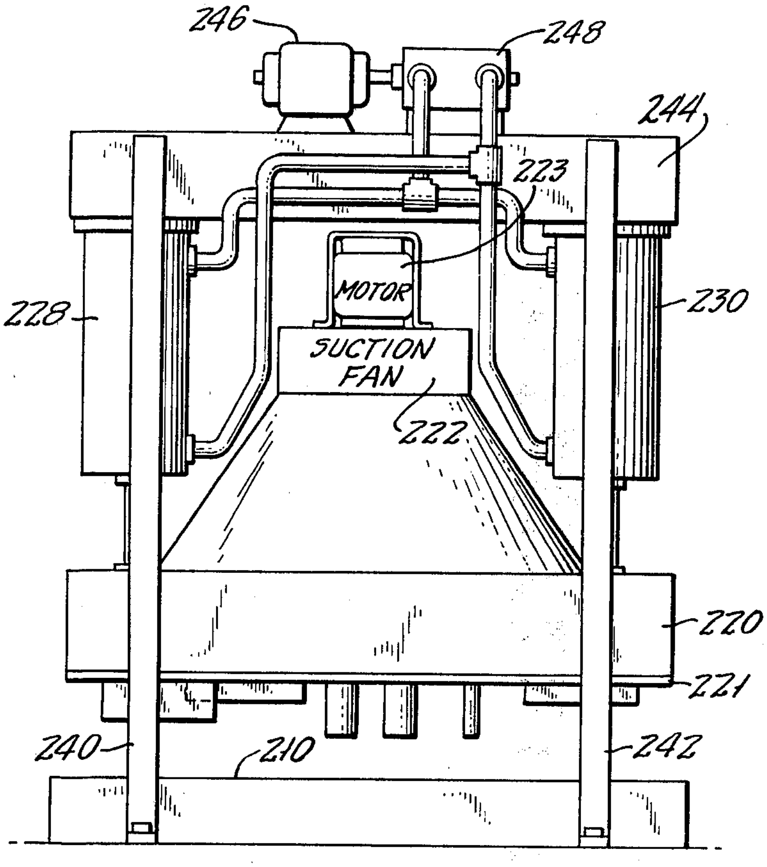
FIG. 4 is a side elevation of an apparatus for sculpturing a mat by only vertical movement of a suction device.

FIG. 4 illustrates schematically a method of sculpturing the mat 210 by suction devices that are simply lowered vertically into the surface of the mat. Since these suction devices do not travel across the mat, a complete pattern of suction devices corresponding to the profiling pattern to be produced on the mat must be provided on the underside of the plenum 220. In this case the plenum 220 is arranged to take interchangeable bottom plates 221, one of which is shown in the figure, for sculpturing mats intended for different molds. Suction is in this case provided by a suction fan 222 rather than by a centrifugal blower, with the drive being provided by the electric motor 223.

The plenum 220 is raised and lowered by cylinders 228 and 230 and the plenum 220 may be guided in its vertical movement by the supports 240 and 242 that hold the head unit 244 on which the cylinders 228 and 230 are mounted, as well as the motor 246 and the hydraulic fluid pump 248 and various other components (not shown) of a system for raising and lowering the plenum 220 and the bottom plate 221 that carries the suction fan 222.

Figure 5:
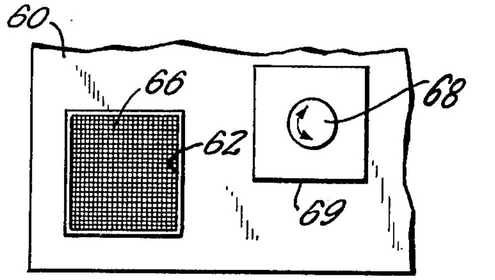
FIG. 5 is a schematic diagram proportioned to an apparatus similar to FIG. 4, shown in partial view.

FIG. 5 shows a bottom plate 60 suitable for mounting on the plenum 220 instead of the bottom plate 221, or rather a region of the bottom plate 60 in the neighborhood of one corner thereof, in which regions are located a broad mouth suction orifice 62 and a tubular suction device 68.

Figure 6:
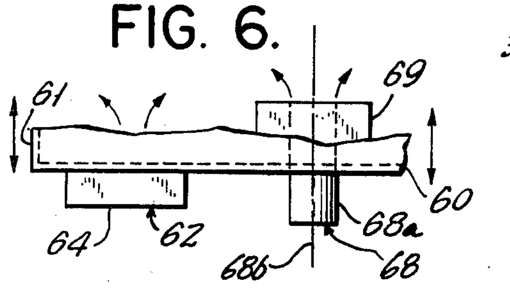
FIG. 6 is a partial side elevation of the subject matter of FIG. 5.

FIG. 6 is a corresponding side view with a broken away portion of the sidewall 61 of the plenum 220.

As shown in these figures the suction orifice 62 has a rim wall 64 an the area of the mouth is provided with a fine wire grid 66. The suction orifice 68 is provided by a cylindrical tube which passing through the plate 60 and fits into an angular vibrator 69 providing a vibration about the axis of the tube 68 in a manner similar to that used for vibratory feeders of small parts onto a conveyor or other machinery.

Figure 7:
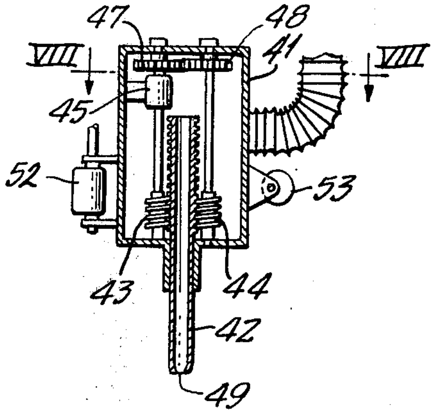
FIG. 7 is a diagrammatic sectional view of a suction device suitable for a travelling carriage arrangement similar to FIG. 1.
Figure 8:
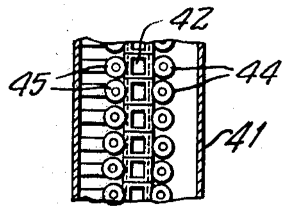
FIG. 8 is a cross-section in the horizontal plane of the device of FIG. 7 along the line VIII—VIII of FIG. 7.

FIGS. 7 and 8 illustrate a different type of suction device for sculpturing a mat of molding material where there are more variations in depth across the narrower dimension of the mold than the case illustrated in FIG. 1. In this case an array of suction tubes 42 is provided extending downward from the plenum 41, each one being driven up and down by means of worms 43 and 44 driven by a stepping motor 45 which is individual to the particular suction tube. Gears 47 and 48 are provided for driving the worm 44, while the worm 43 is driven directly by the stepping motor 45. This type of suction device can be programmed to suit a variety of molds by simply programming the feed of stepping pulses to the various stepping motors as the plenum 41 is advanced in a direction transverse to the lineup of the array of tubes 42.

Figure 9:
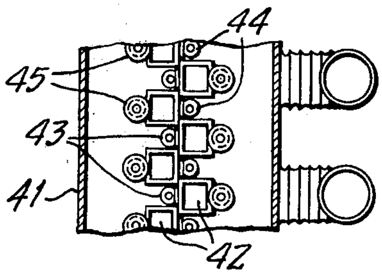
FIG. 9 is a modification of FIG. 8.

The tubes 42 can have walls so thin that the suction of adjacent tubes will not be interrupted by a dead area sufficient to form a ridge between sculptured grooves as the entire device passes down the mold, particularly when the slot 49 goes all the way to the edges of the tube 42 shown in FIG. 7. If it is not practical to make the slots 49 thus notch the side edges of the tubes, the arrangement of FIG. 9 may be used in which the tubes 42 are alternately staggered.

It is desirable to assist suction devices by the application of mechanical agitation effective at the operating end portion of the suction device so as to agitate or cut the fibrous mixture around the edge of the suction slot. With the provision of such mechanical action in aid of the suction it is possible to use wider suction openings, departing from the slot shape described in connection with FIG. 1, in which case a fine grid or lattice may be used to prevent portions of the mat as a whole from being lifted, rather than the removal of the individual fibers or small clumps of fibers. FIG. 7 illustrates vibrators 52 and 53 applied to the plenum 41 for vibrating all of tubes 42 at the same time, in this case by means of eccentric cylindrical masses driven by motors not shown. In this case the vibration will have an up and down component and also a forward and back component. It is also possible to provide vibrators (not shown) on the ends of the plenum 41 for providing lateral vibration, preferably with an addition of an up and down component in synchronism with that provided by the vibrators 51 and 52 if those are also used.

Figure 10:
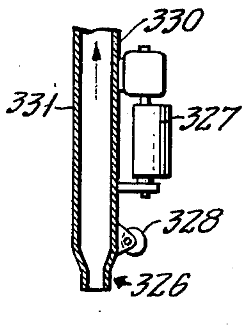
FIG. 10 is a diagrammatic cross-section illustrating the use of vibrators on a suction device.

FIG. 10 shows the tip of a suction blade 326 (like the suction device 26 of FIG. 1) for which the vibrators 327, 328, respectively, for lateral and back and forth vibration (synchronized for the concommitant up and down vibration), are mounted on one of the broad faces 330, 331 of the suction blade and of course it is not necessary that all vibrators be mounted on the same side of the suction blade. FIG. 10 illustrates the provision of the vibrator on the individual blade rather than on the plenum and requires some kind of resilient coupling (not shown) between the mechanism for setting the blade height and the blade, whereas the arrangement of FIG. 7, with the vibrators applied to the plenum, allows a resilient coupling (not shown) to be provided for the mounting of the plenum.

Figure 11:
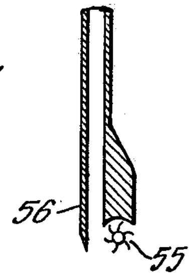
FIG. 11 is a diagrammatic cross-section illustrating another form of mechanical agitation at the mouth of a suction device.

FIG. 11 shows the provision of a rotary blade feeder 55 at the bottom of one side of a suction blade 56. A set of blade wheels can be provided in harrow-fashion (not shown), or axially elongated feeder blades (not shown) can be provided.

Figure 12:
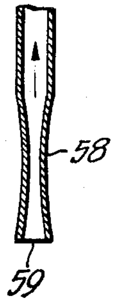
FIG. 12 is a diagrammatic cross-section illustrating modified shaping of the mouth of a suction device.

FIG. 12 illustrates the tip of a suction tube that has a restriction 58 above the mouth 59 instead of a restricted slot type mouth. The air moves faster through the restricted portion of the suction tube and prevents particles from falling back, as well as helping to pull them loose. For the latter function the restriction should be close to the mouth of the tube.

The final pressing of the sculptured mat (not shown) is preferably done in a vertical press, with the lower half of the mold lying on the press table, and the upper half of the mold coming down to it from above on a ram drive capable of supplying the necessary pressure.

When the molding material is placed in the mold in the form of a prepressed and presculptured mat, it is not necessary to vibrate the mold in order to settle the molding material or distribute it. Vibration during application of final pressure may be helpful but is not necessary. A vibratory type of press is illustrated in U.S. Pat. No. 4,226,820, but it must be understood that presses with different pressure cycles without vibrators or with different vibrators may also be useful for the final pressing of a molding mixture preform made from a mat in accordance with the present invention.

The initial pressing of the mat has not been illustrated in the drawing, because it simply involves consolidation of a layer of molding mixture on a flat bed, a layer of essentially uniform depth. The compression is provided either by suction from below through perforations small enough so that none of the filler material particles can be sucked thereinto, or by pressure from a flat member brought down from above, or both, a procedure which hardly requires any illustration. This can be done in a very large installation to make mats, for example, 12 meters long and 3 or 4 meters wide or, if preferred, 10 meters square. The amount of consolidation, whether mostly by atmospheric pressure or mostly by applied pressure, is typically from a 40 cm layered thickness down to a 25 cm mat thickness, but the degree of layer thickness reduction, and of course the desired mat thickness, may vary according to the material used and the requirements of the mold into which the mat is intended to be placed after sculpturing.

Although the invention has been described with reference to particular illustrative processes and apparatus, it will be understood that variations and modifications may be made within the inventive concept.

I claim:

1. A method of preshaping a preformed lignocellulosic mat and then pressure-molding the same in a mold to produce a structural member, comprising the steps of:

making a mat of a mixture of lignocellulosic particles and a hardenable binder, in which mixture said particles are coated with said binder, by compacting a layer of said mixture on a flat bed to an extent barely sufficient to provide enough coherence for transfer thereof to a component of said mold without substantial risk of disintegration of the mat;

trimming the mat in its thickness by insertion, into one surface thereof, of a movable tubular extremity of at least one suction device to pull particles by suction into said at least one suction device in order to reduce the thickness of the mat at predetermined locations to a predetermined extent;

placing the trimmed mat in a component of said mold in a molding press in a predetermined position of said mat relative to said mold; and then pressure molding a structural component from the trimmed mat in said molding press and curing the same by hardening said binder and thereby firmly bonding said particles.

2. A method as defined in claim 1, in which the step of making a mat is performed by reducing, by not more than 50 percent, the thickness of said mixture layer, by means of pressure.

3. A method as defined in claim 1, in which the step of making a mat is performed on a flat bed having perforations of a size too small to admit said particles of said mixture while applying suction to the underside of said layer through said perforations for aiding compaction by evacuation of interstitial air.

4. A method as defined in claim 1, in which said particles of said mixture are fibrous.

5. A method as defined 4, in which said particles of said mixture are wood particles.

6. A method as defined in claim 1, in which the step of trimming said mat in its thickness is performed by moving a suction device evenly and progressively into said one surface of said mat to a predetermined depth.

7. A method as defined in claim 1, in which the step of trimming said mat in its thickness is performed by causing at least one suction device mounted on a carriage to penetrate the surface of said mat while said suction device is moved by said carriage to travel across said mat, the penetration of each suction device into the mat being controlled by a programming element.

8. A method as defined in any one of claims 1, 4 or 5, in which said mixture comprises a content of said binder in the range of 1 to 25 percent by weight.

9. A method as defined in any one of claims 1, 4 or 5, in which said mixture comprises a content of said binder in the range of 12 to 15 percent by weight.

10. A method as defined in claim 1, in which the step of pressure molding produces a volume reduction by which the volume of said structural component is brought down to between one-third and one-fifteenth of the volume of said trimmed mat.

11. A method as defined in claim 1, in which the step of trimming said mat in its thickness is performed by means of suction devices that are caused to vibrate, whereby the material of said mat is subjected to agitation where the suction is applied.

12. A method as defined in claim 1, in which the step of trimming said mat in its thickness dimension is performed with the provision of mechanical agitation of the surface material of said mat in the immediate vicinity of the insertion of a suction device into a surface of the mat for facilitating the removal of particles of the mat by suction.

* * * * *